United States Patent [19]

Thiel et al.

[11] Patent Number: 5,464,077
[45] Date of Patent: * Nov. 7, 1995

[54] FLOATING-CALIPER SPOT-TYPE DISC BRAKE FOR HIGH-POWERED VEHICLES

[75] Inventors: Rudolf Thiel; Andreas Doell, both of Frankfurt am Main; Georg Halasy-Wimmer, Eschborn, all of Germany

[73] Assignee: ITT Automotive Europe GmbH, Frankfurt am Main, Germany

[*] Notice: The portion of the term of this patent subsequent to Sep. 6, 2011, has been disclaimed.

[21] Appl. No.: 221,195

[22] Filed: Mar. 31, 1994

Related U.S. Application Data

[62] Division of Ser. No. 926,489, Aug. 7, 1992, Pat. No. 5,343,985.

[30] Foreign Application Priority Data

Aug. 9, 1991 [DE] Germany .................. 41 26 339.1

[51] Int. Cl.⁶ .................. F16D 65/092; F16D 55/227
[52] U.S. Cl. .................. 188/72.5; 188/73.39
[58] Field of Search .................. 188/72.1–72.5, 188/73.32, 73.39, 250 B

[56] References Cited

U.S. PATENT DOCUMENTS

| | | | |
|---|---|---|---|
| 3,113,643 | 12/1963 | Botterill | 188/72.5 |
| 3,390,744 | 7/1968 | Fawick | 188/72.2 |
| 3,500,966 | 3/1970 | Birge | 188/72.4 |
| 4,121,699 | 10/1991 | Tsurata et al. | 188/250 B |
| 4,540,068 | 9/1985 | Ritsema | 188/72.3 |
| 5,103,939 | 4/1992 | Schroeter | 188/72.4 |
| 5,129,487 | 7/1992 | Kobayashi et al. | 188/250 B |
| 5,249,649 | 10/1993 | Emmons | 188/73.39 |
| 5,343,985 | 9/1994 | Thiel et al. | 188/72.5 |

FOREIGN PATENT DOCUMENTS

| | | | |
|---|---|---|---|
| 2459909 | 2/1981 | France | 188/72.5 |
| 3913903 | 10/1990 | Germany | 188/72.4 |
| 2132293 | 7/1984 | United Kingdom | 188/250 B |
| 2258506 | 10/1993 | United Kingdom | 188/72.4 |

*Primary Examiner*—Robert J. Oberleitner
*Assistant Examiner*—Chris Schwartz
*Attorney, Agent, or Firm*—Robert P. Seitter; J. Gordon Lewis

[57] ABSTRACT

The invention is related to a spot-type disc brake with a stationary brake carrier (19) at which a floating caliper (1) is slidingly guided which straddles the edge of a brake disc (10), with two brake cylinders (11, 12) which are positioned on the internal axial side of the brake disc (10) aside each other and whose brake pistons (13, 14) act on the brake shoes (5, 7) which are arranged on the same axial side and in circumferential direction of the brake disc (10) at a distance from each other. According to the invention a third brake shoe (6) is fixed on the external axial side of the brake disc (10) to the floating caliper (1), which brake shoe is positioned staggered in such a manner that its friction area point of gravity (36) comes to be arranged substantially between the other two brake shoes (5, 7) in the circumferential direction of the brake disc (10). Braking noises and brake rubbing are eliminated by this arrangement. Further advantages of the inventive brake are constituted by its ease of serviceability in view of an ease of mounting of the brake shoes (5, 6, 7) and by its floating caliper (1) which allows to be manufactured with ease and at but low cost and with but little material, and which simultaneously with a low weight affords an elevated stiffness and a large brake disc diameter.

5 Claims, 6 Drawing Sheets

FLOATING-CALIPER SPOT-TYPE DISC BRAKE FOR HIGH-POWERED VEHICLES

This application is a division of application Ser. No. 07/926489, filed Aug. 7, 1992, now U.S. Pat. No. 5,343,985.

BACKGROUND OF THE INVENTION

The invention is related to a floating-caliper spot-type disc brake which is particularly designed for high performance.

Automotive vehicles which reach high driving speeds need high performance brakes, which require as large as possible a brake disc diameter, while the diameter of the vehicle wheels cannot be increased because of other considerations. The mounting space for the brake is thus severely restricted between the external edge of the brake disc and the predetermined diameter of the wheel rim. The brake caliper of a disc brake customarily straddles the external edge of the brake disc, with a bridge of the brake caliper positioned in the forementioned mounting space, and thus the radial dimension of the bridge limits the maximum diameter of the brake disc. The caliper bridge must, on the other hand, have a determined minimum thickness because it transmits the clamping forces which are required for braking action.

From the European patent specification, No. 0 412 541 a disc brake suitable for a high brake power is known, having a brake caliper in the shape of a floating frame which is axially slidingly guided on a brake carrier. The brake carrier in turn is mounted to the steering knuckle of the vehicle by means of pin guides which extend axially beyond the external edge of the brake disc. The floating frame encloses four brake shoes which are disposed on either side of the brake disc and transmits the clamping force. The circumferential forces are transmitted by the brake shoes to the brake carrier. The brake carrier is coupled to the vehicle on the axially internal side of the wheel. In order to be able to also absorb the circumferential forces of the two axially external brake shoes, the brake carrier is furnished with a carrier arm which straddles the external edge of the brake disc.

High-performance brakes require large brake shoe friction surfaces. However an increase in size of the brake shoes particularly in the circumferential direction of the brake disc has the disadvantage that the friction surface is no longer uniformly pressed against the brake disc, even if two brake cylinders arranged side by side are used.

Beyond this, large brake shoes tend to generate braking noises and rubbing, especially when the circumferential force which occurs during braking is transmitted by the brake shoe to the brake housing on the exit side of the brake disc. For this reason, two short-size brake shoes are used which are pressed against the brake disc separately from each other by two brake pistons which are arranged one beside the other.

Another requirement of a high-performance brake is that its weight must be as low as possible. Indeed, heavy brakes present a particular problem because this increases the unsprung masses at the vehicle wheels. This, in turn, has negative effects on the driving performance of the vehicle. The brake power cannot for this reason be increased simply by increasing the brake size.

It is the object of the invention to create a floating-caliper spot-type disc brake with high brake power which does not generate excessive noise and rubbing.

SUMMARY OF THE INVENTION

This object is achieved by arranging the centroids of the friction surfaces of the brake shoes abutted against different axial sides of the brake disc not opposite one another but staggered or offset with respect to one another in the circumferential direction of the brake disc.

The disc brake according to the invention is preferably furnished with three brake shoes, two of which are positioned on the internal axial side of the brake disc and spaced from each other in the circumferential direction. A third brake shoe is disposed on the other axial side and viewed in projection overlaps with its friction surface the friction surfaces of the other two brake shoes. In this configuration, the friction surface area of the third brake shoe preferably corresponds to the sum of the friction surface areas of the other two in order to make sure that all three of the brake linings are abraded at a roughly uniform rate.

In another embodiment according to the invention, four brake shoes are provided, two of which are disposed on the internal axial side and two on the external axial side of the brake disc. The first two brake shoes are spaced a smaller distance from each other in the circumferential direction than the latter two, as a result whereof a staggered or offset arrangement is again created.

It has been found that the staggered or offset arrangement offers the advantage that any rubbing of the brake or braking noises, such as, for example, squealing, are largely avoided. This is believed to result from the main points of stress being disposed spatially staggered or offset along the brake disc, so that vibratory undulations and changes of thickness of the brake disc from one point of stress to the other have a temporally balancing effect.

In a preferred embodiment, the circumferential force occurring during braking action is transmitted from a brake shoe being fixed on the external axial side of the floating caliper not directly to the brake carrier but indirectly through the floating caliper. In this case, the brake carrier may be particularly simple and light-weight, since it is not required to extend from one axial side of the brake disc to the other beyond the latter's external edge in order to absorb there directly the circumferential force of an external brake shoe.

A pin guide with a supporting pin transmits the circumferential force and with an elastically guided guide pin offers the advantage that inaccuracies which are due to manufacturing techniques, for example slightly differing distances between the two pins, can be accommodated by the elastic guide.

The supporting pin is preferably disposed symmetrically in the center of the brake. Due to the uniform flux of force at this point and because the pin acts on a zone of the brake carrier which is only lightly stressed, the pin guide cannot practically cant in this arrangement and allows, therefore, free movement.

A preferred embodiment of the brake carrier comprises a circumferentially extending connecting section having a central arm projecting radially therefrom, with a pair of side arms projecting radially at either end. On account of its simple configuration, a brake carrier of this type is particularly suited for integration with the steering knuckle of the vehicle.

In particular with an integrated brake carrier, the supporting pin is preferably press fitted into a bore in the brake carrier. Depending on the spatial conditions, it may, however, be more favorable to press fit the supporting pin into a bore in the floating caliper. The weight of the brake is reduced still further by making the slide fit portion of the supporting pin hollow.

A floating caliper formed as a thin walled shell with openings for installation and removal of the brake shoes results in a very small mass combined with extreme rigidity and affords a large diameter of the brake disc due to a low thickness in the section extending between the external edge of the brake disc and the wheel rim. The requirements of a high-performance brake are, therefore, met particularly well in this instance. This is supplemented by the ease of maintenance because the brake shoes may be easily installed and removed through the openings in the floating caliper.

A two part floating-caliper housing is preferred for simpler manufacturing because the brake cylinder bores can be more easily machined. Connecting the housing parts by means of three screws allows a reduction in the weight of the brake as compared to the use of the typical four screws. Moreover, the vibration performance of the brake is improved by a centrally located screw connection.

The floating caliper could alternatively be of one piece construction. In this case, the brake cylinder bores would have to be machined through to the outside and the hydraulic cylinders subsequently be closed by a cover piece.

A typical mode of fixing the brake shoes as is known from European patent specification, No. 0 412 541 includes retaining pins which are disposed in the space between the wheel rim and the external edge of the brake disc, restricting the maximum possible diameter of the brake disc. Moreover, special tools are required for installation and removal of the brake shoes.

In a preferred arrangement for fixing the brake shoes, these disadvantages are avoided. This arrangement includes a projection on the backplate of the brake shoes within the diameter of the brake disc so as to not restrict the brake disc diameter. For mounting, a brake shoe is inserted from the outside through an opening of the floating caliper, and is urged radially against a spring and the projection is locked to a bore in the floating caliper or in a brake piston, with the projection engaging an edge of the bore. Manual installation and removal may be carried out safely and quickly.

A conical shape of the projection of the backplate ensures that the brake shoe is firmly seated against the edge of the bore in the brake piston or the floating caliper free from any looseness causing rattling.

The spring employed for biasing of each brake shoe to be abutted against the brake piston is formed with clips to grip and be locked to the brake carrier. The spring for biasing of the brake shoe which is fixed to the floating frame may simply be attached with a threaded fastener.

The inventive disc brake is improved so as to reduce noise by forming elongated webs on the brake shoe mounted to the external side of the floating caliper which mate with grooves in the caliper. The webs serve to transmit the circumferential force from the brake shoe disposed on the external axial side of the floating frame. The distances of the webs and grooves relative to one another ensure that the circumferential force is always transmitted through the web on the entering side of the brake disc. Experience has shown that such a "dragged" brake shoe will not undergo noise-generating vibrations.

DETAILED DESCRIPTION

Figure 1:
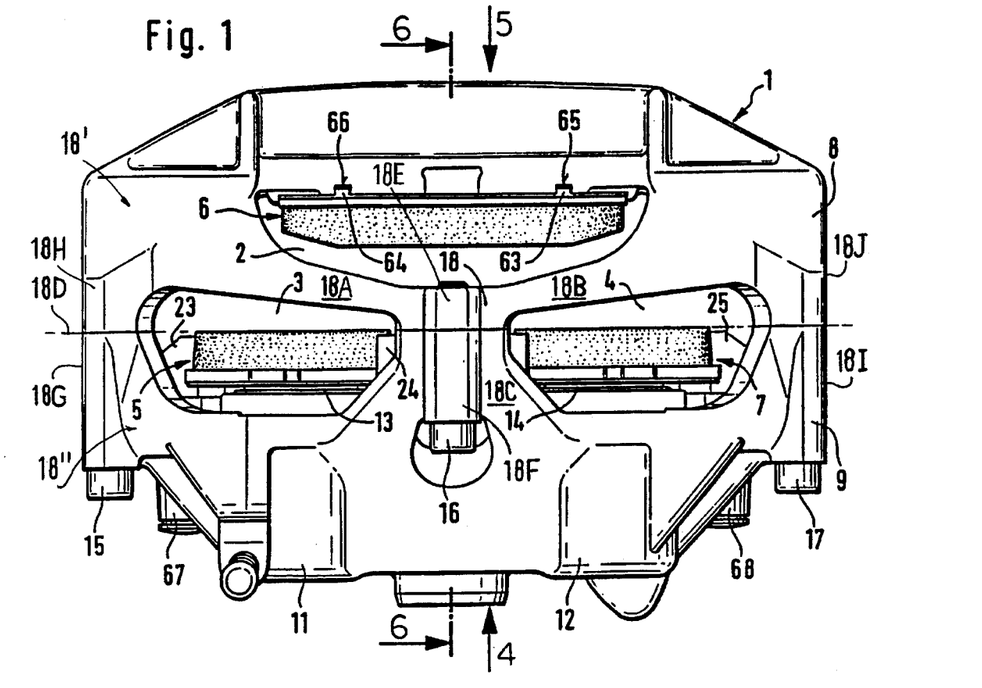
FIG. 1 is a top view of one embodiment of the disc brake according to the invention having three brake shoes.
Figure 2:
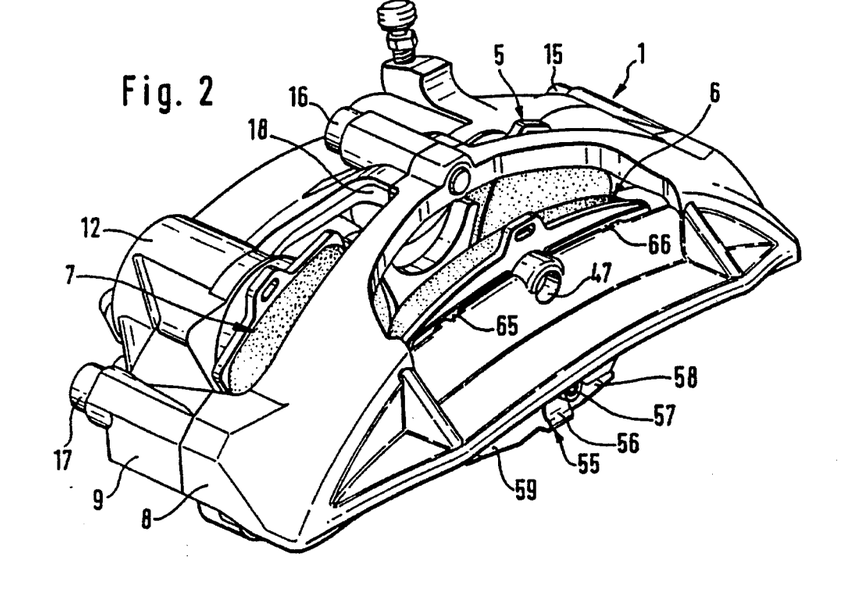
FIG. 2 is a perspective view of the disc brake shown in FIG. 1.

In FIGS. 1 and 2, a floating caliper 1 of a shell-type construction is shown with three large recesses 2, 3, 4, through which three brake shoes 5, 6, 7 can be installed and removed. The floating caliper 1 extends beyond the external edge of a brake disc 10 (FIG. 6) and is provided on the inner axial side with a hydraulic unit which is comprised of brake cylinders 11, 12 positioned side by side, each having a respective brake piston 13, 14.

Figure 4:
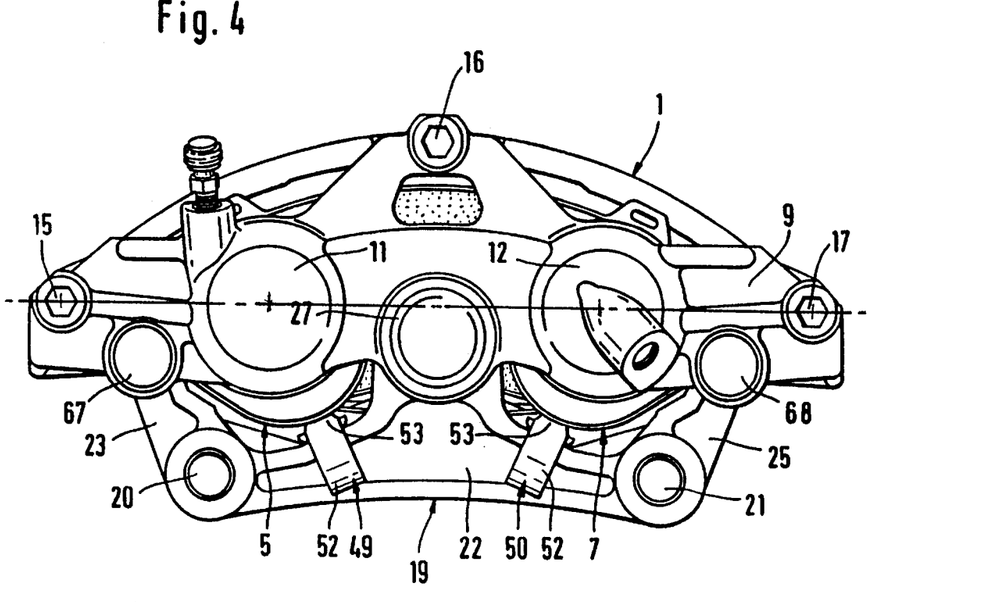
FIG. 4 is a reverse view of the disc brake as seen from the direction 4 in FIG. 1.

The floating caliper 1 is composed of two housing parts 8, 9, which are coupled together by three screws 15, 16, 17, each extending parallel to the brake cylinders 11, 12. One screw 16 is positioned in the center of the housing and two screws 15, 17 are arranged with their centerlines extending through an imaginary line passing through the center of the brake cylinders 12, 12 (FIG. 4) at the outer margin of the floating caliper 1, as seen in the circumferential direction of the brake disc 10. This arrangement ensures that the screws 15, 16, 17 do not transmit any substantial bending moments and substantially undergo only tensile stresses, such that small sized screws can be employed.

The bridge 18, which is coupled by the screw 16 contributes to the stiffening of the floating caliper 1. On the whole, the floating caliper 1 is optimized for a high-performance brake as to strength and weight due to its shell-type construction with the recesses 2, 3, 4 and due to the arrangement of the screws 15, 16, 17.

The shell construction of the caliper comprises a relatively thin wall bridge 18 interconnecting the two caliper housing parts 8, 9, the thin wall arching over the intervening space to accommodate the outer perimeter brake disc 10.

The recesses 2, 3, 4 in the thin wall bridge 18 create a series of webs 18A, 18B, 18C arching over the brake disc 10. The bridge 18 is formed in two wall segments 18', 18" in the embodiment shown, each part segment integrally formed with a respective caliper housing part 8, 9 and projecting towards each other to abut each other at each end and at the center along a parting plane 18D.

The center abutment of the segments 18', 18" are formed with enlarged protruberances 18E, 18F aligned with each other and formed with aligned bores so as to be able to receive central screw 16, in part securing the caliper housing parts 8, 9 together.

The outer ends of the housing parts 8, 9 are also integrally formed with enlarged aligned portions 18G, 18H, 18I, 18J at the end abutting parts of the segments 18', 18" having aligned bores receiving the outer screws 15, 17 extending across the outer edge of the brake disc 10.

Figure 8:
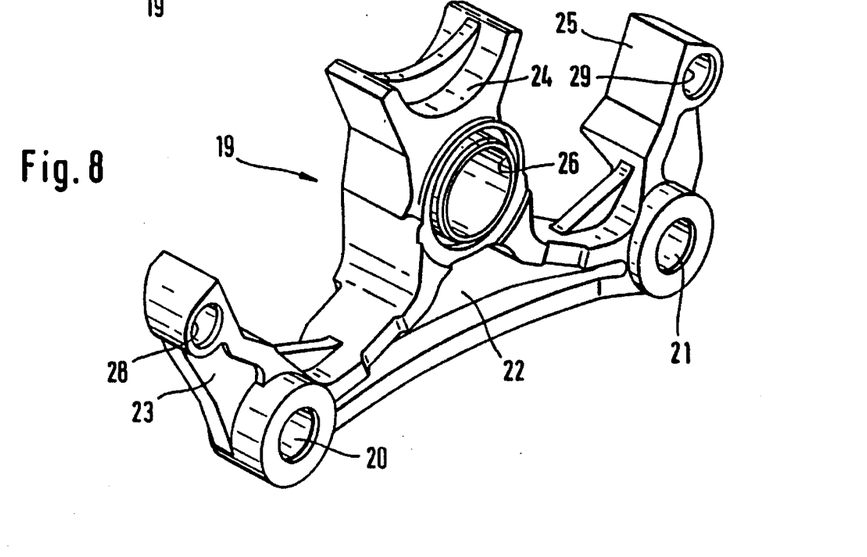
FIG. 8 is a perspective view of the brake carrier.

In FIG. 8, a brake carrier 19 is illustrated which is formed with two bores 20, 21 for receiving two anchor screws serving to anchor it to the steering knuckle of the vehicle (not shown). A central carrier arm 24 and two externally disposed carrier arms 23, 25 extend from a fixing section 22 of the brake carrier 19. Between the carrier arms 23, 24, 25 there are disposed two brake shoes 5, 7, axially slidingly arranged, the carrier arms 23, 24, 25 absorbing the circumferential forces from the brake shoes 5, 7 during braking action. The central carrier arm 24 is furnished with a bore 26 to accommodate a supporting pin 27 (FIG. 6), and the two external carrier arms 23, 25 are formed with bores 28, 29 for the two guide pins 30, 31.

The pins 27, 30, 31 support the floating caliper 1 to be axially slidingly guided on the brake carrier 19.

Figure 6:
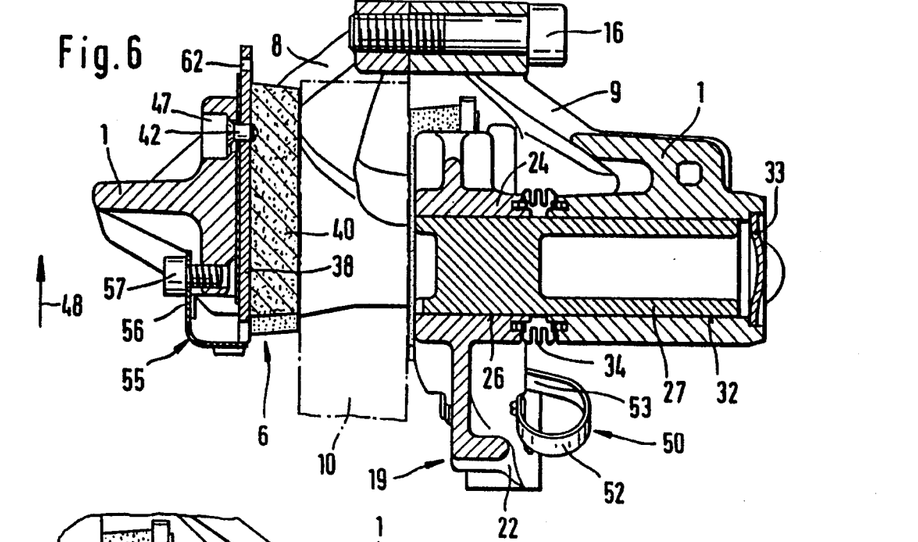
FIG. 6 is a cross section along the line 6—6 in FIG. 1, showing a supporting pin which is pressed into the brake carrier.

As is best seen in FIG. 6, the brake shoe 6 which is disposed on the external axial side of the brake disc 10 is fixed to the floating caliper 1. The circumferential force which occurs during braking at the brake shoe 6 will be transmitted through the floating caliper 1 to the internal axial side and there to the supporting pin 27 which takes support on the brake carrier 19. The supporting pin 27 must be of substantial size and is firmly pressed into the bore 26 of the brake carrier 19, and is closely fit to slide with minimal clearance within a bore 32 of the floating caliper 1. For protection against dust, bore 32 is closed by a cover 33, and an elastic sleeve 34 is positioned around the supporting pin 27 between the floating caliper 1 and the brake carrier 19 for this same purpose.

Figure 7:
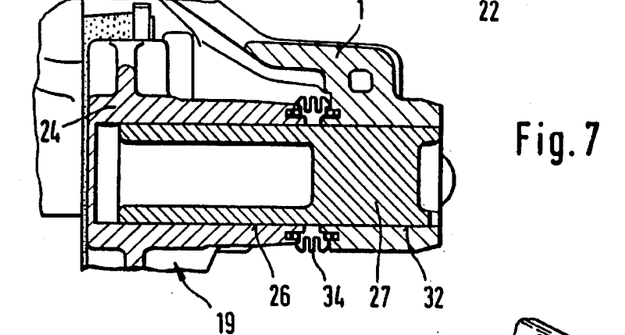
FIG. 7 is an enlarged sectional view of the components shown in FIG. 6, but with a supporting pin pressed into the floating caliper.

In another embodiment which is illustrated in FIG. 7, the supporting pin 27 is pressed into the bore 32 of the floating caliper 1, whereas it axially slides in the bore 26 of the brake carrier 19. The section of the supporting pin 27 which is pressed in in each instance is solid for maximum rigidity, while the sliding section is hollow in order to save weight.

The guide pins 30, 31 slide in two elastic bearings 67, 68 in this embodiment. They do not transmit any circumferential forces but are intended exclusively for the self aligning guidance of the floating caliper 1 and therefore, may be of small size. The guide has a play due to the elasticity of the bearings 67, 68, by which inaccuracies may be accommodated which are due to the manufacturing tolerances.

Figure 3:
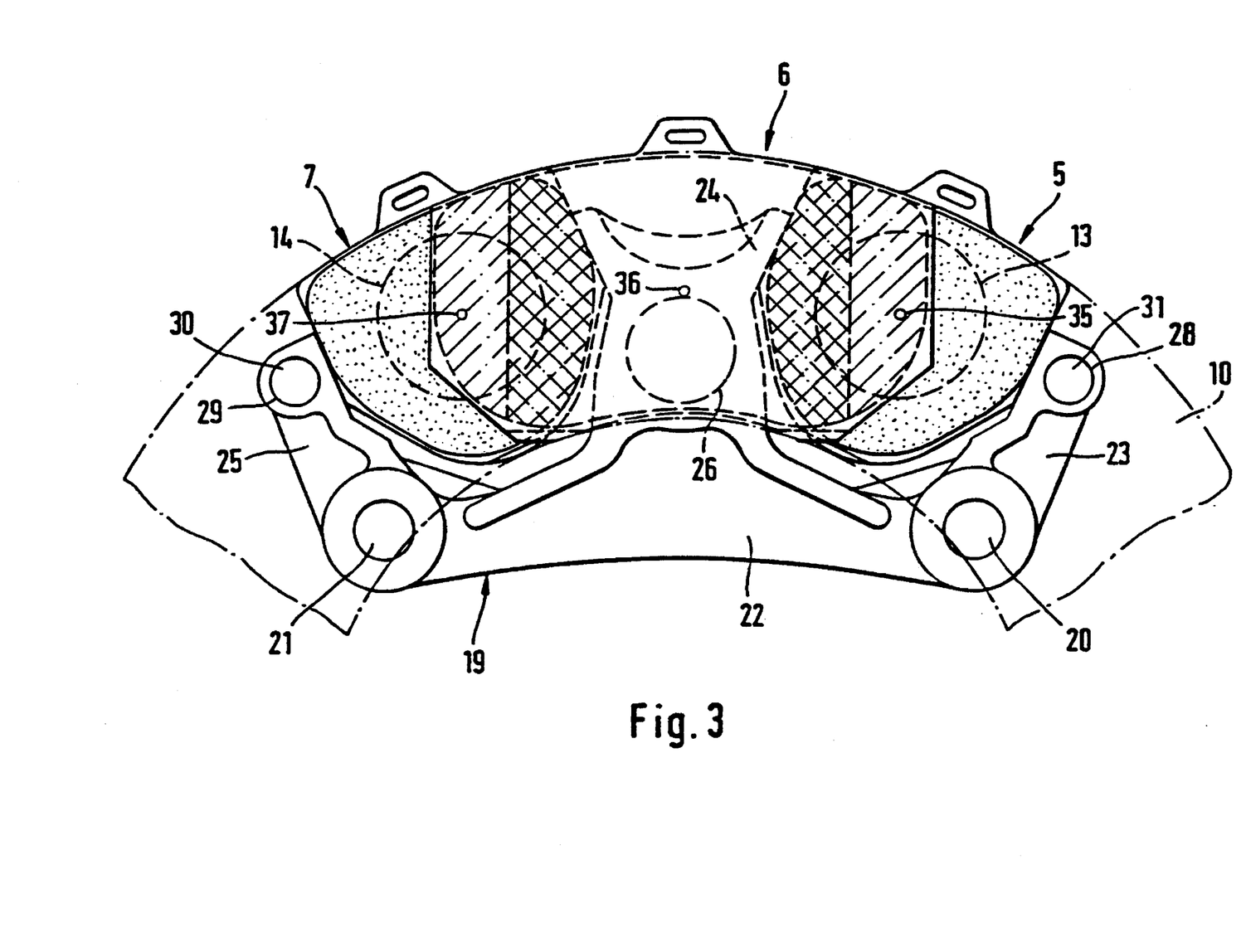
FIG. 3 is a diagrammatic representation of the friction surfaces of the brake shoes illustrating the staggered or offset arrangement.

As is visible in FIGS. 1 and 3, the brake shoes 5, 6, 7 are disposed staggered or offset in the circumferential direction of the brake disc 10. The centroid 36 of the friction surface of the brake shoe 6 is positioned, in the projection (FIG. 3), in the middle between the centroids 35, 37 of the friction surfaces of the brake shoes 5, 7. The friction surface area of the brake shoe 6 corresponds to the sum of the friction surface areas of the brake shoes 5, 7 and overlaps with the latter as is outlined by shading in FIG. 3.

Figure 9:
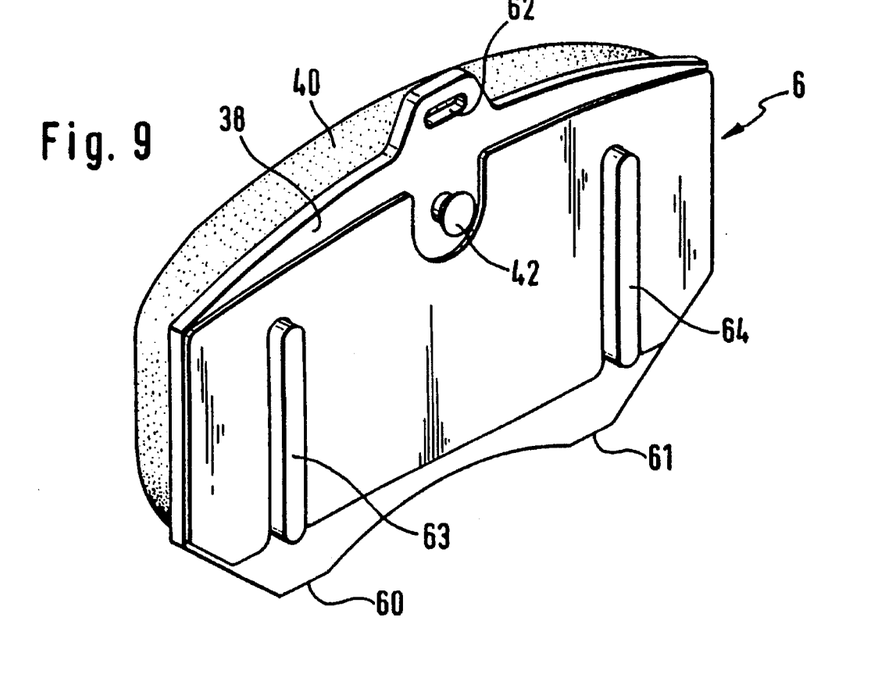
FIG. 9 is a perspective view of the brake shoe fixed to the floating caliper.
Figure 10:
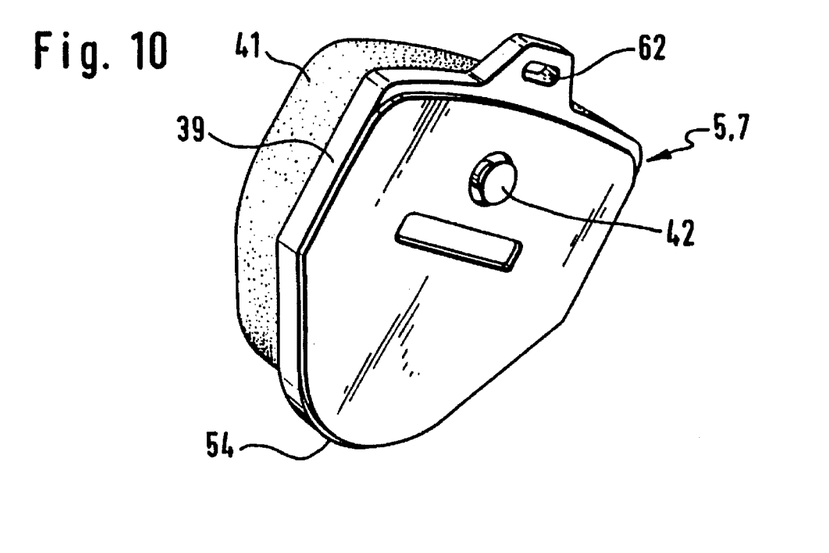
FIG. 10 is a perspective view of the brake shoe which is intended to be fixed to the brake carrier and to the brake piston.
Figure 11:
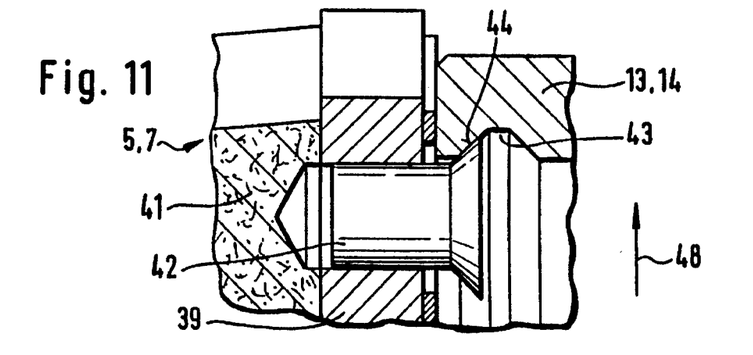
FIG. 11 is a sectioned fragmentary view of the brake shoe together with a pin pressed into a bore of the backplate of a brake shoe together with a fragmentary sectional view of a piston engaged by the pin.

In FIGS. 9 and 10 the brake shoes 5, 6, 7 are shown individually. Each of them is substantially comprised of a backplate 38, 39 and of a friction lining 40, 41. On the side of the backplate 38, 39 facing away from the friction lining 40, 41, a pin 42 is pressed in which is intended for fixing of the brake shoe 5, 6, 7 in the brake. As is shown in FIG. 11 by example of the brake shoe 5, 7, the pin 42 is conically widened toward its free end and engages a hollow brake piston 13, 14 where it is locked in a circumferential annular groove 43 and is in abutment with a conical section 44 of the annular groove 43.

Figure 12:
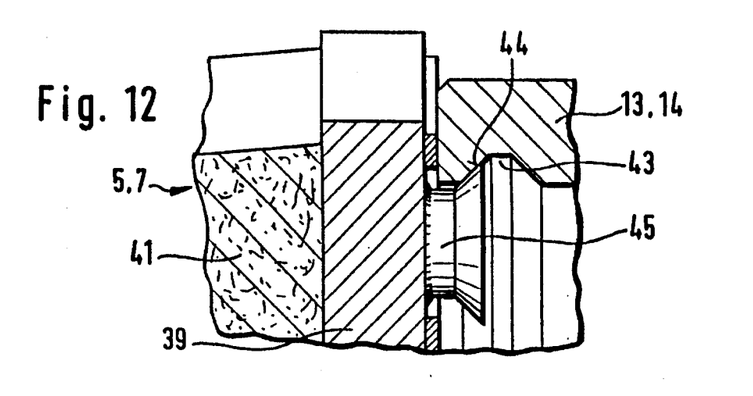
FIG. 12 is a view of a sectional fragmentary brake shoe together with a pin which is welded to the backplate, and a fragmentary sectional view of a piston engaged by the pin.
Figure 13:
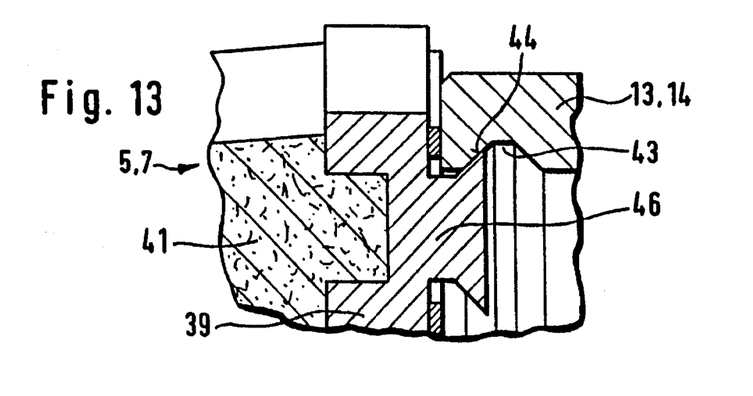
FIG. 13 is a view of a brake shoe similar to that of FIG. 11, but with a buttonhead through projection which is shaped out of the backplate.

As an alternative to this, a modified pin 45 may also be welded to the backplate 38 or 39 as is shown in FIG. 12, as by friction welding. In a version which is illustrated in FIG. 13, a separate pin is eliminated. In this instance, the backplate 38 or 39 is formed with a buttonhead through projection 46 whose projecting end has a conical shape.

For fixing of the brake shoe 6, the floating caliper 1 is provided with a stepped bore 47 which is engaged by the pin 42 (FIG. 6).

Figure 5:
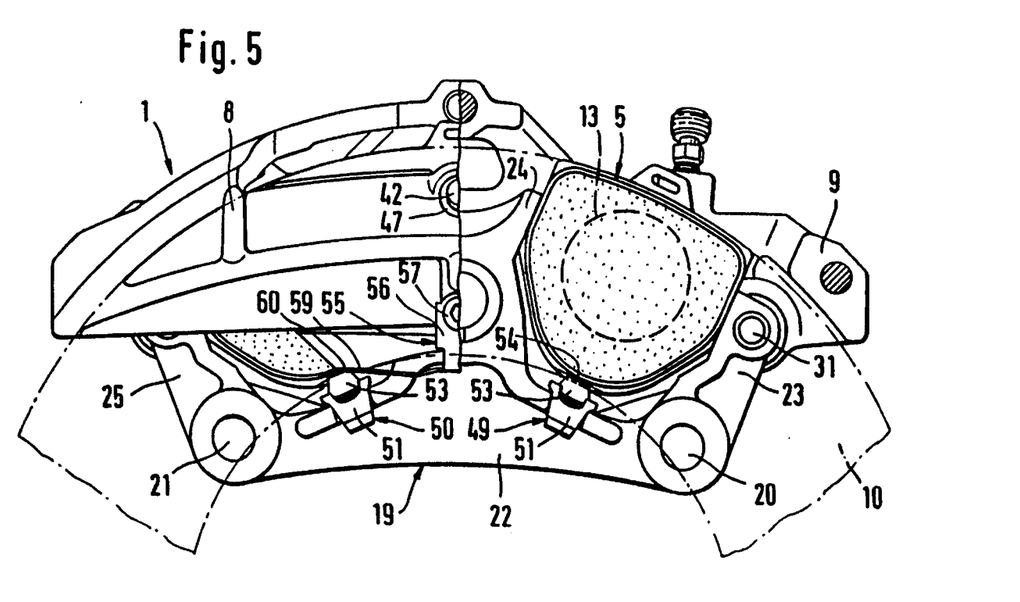
FIG. 5 is a partly sectioned front view of the disc brake as seen from the direction 5 in FIG. 1.

In order that a brake shoe 5, 6, 7 is firmly locked with its pin 42 in the annular groove 43 or in the stepped bore 47, it has to be biased outwardly in the radial direction 48. Two leaf springs 49, 50 are fixed to the brake carrier 19 (FIGS. 4, 5) for the biasing of the brake shoes 5, 7. Each of the leaf springs 49, 50 has two anchor clips 51, 52 which grip the section 22 of the brake carrier 19 and lock there. The free end of the anchor clip 52 which is bent over loop-shaped is utilized as a spring tongue 53 which is in abutment against the radially narrow side 54 of the brake shoe 5, 7 and urges it into the radial direction 48.

The other brake shoe 6 is biased by another leaf spring 55 which is fixed at its central section 56 by means of a screw 57 to the floating caliper 1. The leaf spring 55 is formed with two spring arms 58, 59 which, starting from the central section 56, point in opposite directions and are abutted against two points 60, 61 of the radially narrow side of the brake shoe 6.

At their radially external narrow sides, each of the backplates 38, 39 of the brake shoes 5, 6, 7 is furnished with an ear 62 which serves to facilitate mounting. If, for example, a brake shoe 5, 6, 7 jams it will be possible to get a firm grip with a suitable tool at the ear 62 in order to be able to pull more firmly.

The backplate 38 of the brake shoe 6 is provided with two webs 63, 64 which extend at right angles to the circumferential direction of the brake disc 10 and parallel to each other. The webs 63, 64 engage associated grooves 65, 66 of the floating caliper 1. The width and the distance of the grooves 65, 66 are slightly larger than those of the webs 63, 64 so that the circumferential force will always be transmitted from the brake shoe 6 to the floating caliper 1 through the web which is positioned on the entering side of the brake disc.

We claim:

1. A floating-caliper spot-type disc brake for an automotive vehicle having a brake disc and a steering knuckle, said disc brake including a brake carrier adapted to be fixed to said steering knuckle;

a floating caliper having a first part adapted to be located on an axially internal side of a brake disc and a second part adapted to be located on an axially external side of a brake disc;

two brake shoes mounted on said first part of said brake caliper and one brake shoe mounted on said second part thereof, said one brake shoe being centered between said two brake shoes;

a shell structure connecting said first and second parts together, said shell structure comprising a thin wall extending along the circumference of each of said caliper first and second parts, and also adapted to extend across a brake disc perimeter;

said shell structure having a plurality of openings formed therein, each located over a respective brake shoe and configured to allow withdrawal of said brake shoe through said opening, said openings in said shell structure thin wall defined by a series of webs extending above said brake shoes;

one of said openings located over said one brake shoe and partially defined by a pair of said series of webs, said pair of webs converging together, each web in said pair extending from a respective outside end of said second caliper part;

a pair of said openings each aligned over a respective one of said two brake shoes, and partially defined by one of said series of webs centrally located and extending axially to meet said pair of webs whereat said pair of webs converge;

means for axially slidingly guiding said floating caliper on a brake carrier;

said brake shoes each mounted on said caliper for limited axial movement towards and away from a brake disc to be engageable therewith, and to transmit the reaction force of said brake shoes engaging a brake disc into a brake carrier;

hydraulic actuating means adapted to urge one of said brake shoes into engagement with an axially internal side of a brake disc, said hydraulic actuating means mounted on said first part of said floating caliper on an axially internal side of a brake disc, said second part of said floating caliper engaging said other brake shoe to urge the other of said brake shoes into engagement with an axially external side of a brake disc upon operation of said hydraulic actuating means.

2. The disc brake according to claim 1 wherein said shell structure thin wall is formed by separate wall segments, each wall segment integral with a respective caliper part and abutting each other, said segments joined together to form said shell structure, said pair of webs converging together formed as a part of said one segment, and said web centrally located formed as a part of said other segment.

3. The disc brake according to claim 2 wherein abutting portions of said wall segments are integrally formed with three enlarged portions, said enlarged portions each formed with aligned bores receiving threaded fasteners, whereby a three point connection is established between said caliper parts.

4. The disc brake according to claim 3 wherein a pair of hydraulic cylinders are provided, each centered over a respective brake shoe on one side of said brake disc and wherein two of said threaded fasteners are located at either end of said wall segments, extending parallel to said hydraulic cylinders, each of said two threaded fasteners having an axis extending through an imaginary line passing through the center of both hydraulic cylinders, whereby said two threaded fasteners are only minimally loaded in bending.

5. The disc brake according to claim 1 wherein said shell structure thin wall arches over said brake disc perimeter.

\* \* \* \* \*